US005333720A

United States Patent [19]

Zwigart et al.

[11] Patent Number: 5,333,720

[45] Date of Patent: Aug. 2, 1994

[54] APPARATUS TO MANIPULATE WORKPIECES

[75] Inventors: John M. Zwigart, New Brighton; Mark R. Tweedy, Valencia; Gary W. McCoy, Evans City, all of Pa.

[73] Assignee: Carl Strutz & Co., Inc., Mars, Pa.

[21] Appl. No.: 882,939

[22] Filed: May 14, 1992

[51] Int. Cl.[5] .............................................. B65G 47/24

[52] U.S. Cl. ................................ 198/409; 198/468.2; 414/226; 101/40

[58] Field of Search ............................ 198/409, 468.2; 414/225, 226; 101/37, 40, 40.1

[56] References Cited

U.S. PATENT DOCUMENTS

| | | | |
|---|---|---|---|
| 2,231,535 | 2/1941 | Jackson et al. . | |
| 2,261,255 | 11/1941 | Jackson . | |
| 2,721,516 | 10/1955 | Campbell et al. . | |
| 3,146,705 | 9/1964 | Ritzerfeld et al. . | |
| 3,159,100 | 12/1964 | Marquiss | 198/468.2 |
| 4,176,598 | 12/1979 | Dubuit | 101/40.1 |
| 4,343,391 | 8/1982 | Skrypek et al. | 101/40 |
| 4,463,371 | 7/1984 | Lewis, Jr. . | |
| 4,822,233 | 4/1989 | Hansel | 414/225 |
| 5,249,663 | 10/1963 | McCoy et al. | 198/468.2 |

*Primary Examiner*—Joseph E. Valenza

*Attorney, Agent, or Firm*—Clifford A. Poff

[57] ABSTRACT

Workpieces are manipulated between the receiving position and the discharge position by supporting gripper arms on a platform mounted on a pivot shaft. The pivot shaft pivots between a position where a workpiece is gripped by one or more moveable gripper arms through a pivotal discharge position where the workpiece is released by the gripper arms. The pivot shaft is moved horizontally by a threaded adjusting screw toward and away from a vacuum chuck in a silk-screen printing machine to compensate for changes to the length of the workpiece to be carried by the vacuum chuck. This allows conveyors to remain at fixed elevations and merely change the site at which the workpieces are picked up in the case of a loading mechanism from a feed conveyor and the site where workpieces are deposited on a conveyor for an unloading operation.

15 Claims, 14 Drawing Sheets

APPARATUS TO MANIPULATE WORKPIECES

BACKGROUND OF THE INVENTION

1. Field of the Invention

This invention relates to manipulating workpieces incident to transporting of the workpiece by a conveyor for the application of decoration in a decorating facility. More particularly, the present invention relates to providing a manipulating apparatus to grip a workpiece at a preselected distance along the length of the workpiece so as to present an end of the workpiece to a support such as a conveyor or a vacuum chuck with precise placement of the workpiece during disengagement phase of the manipulation operation.

2. Description of the Prior Art

As shown in U.S. Pat. Nos. 2,231,535; 2,261,255; 2,721,516; and 3,146,705 intermittent motion type decorating machines are known in the art and provide a drive system to impart intermittent traveling motion to the workpieces such as containers made of glass or plastic. A container is moved through a predetermined distance, stopped, moved again through a predetermined distance, stopped and again moved until each container through the sequence of motions moves completely through the decorating stations of the machine. A decorating station will be provided at each place where the container comes to a stop. At the decorating station, a decorating screen is displaced into line contact with the surface of the container by as associate squeegee and then the container is rotated and the squeegee remains stationary for a decorating process. It is advantageous for this decorating process to provide that the container surface which is to receive the decoration is horizontally oriented. This is because the printing medium is subject to the influence of gravity whereby the printing medium can be uniformly spread across the screen surface when the squeegee spreads the printing medium horizontally. When the ink spreading surface of the squeegee is oriented vertically, it is difficult to maintain an adequate supply of ink throughout the height of the printing screen. The advantages of decorating the workpiece while the workpiece is orientated horizontally is equally applicable to other examples of workpieces such as glass tumblers where, for example, it is possible to grip the workpiece at one end only. With respect to a soda bottle, for example, the bottle mouth site usually regarded as too small of an area to sustain the weight of the bottle by a vacuum chuck. Alternative support systems can be used such as engaging only the bottom base or alternate the opposite ends of the soda bottle.

There are, however, machines known in the art for applying decoration to a surface while orientated vertically. An example of such a machine is disclosed in U.S. Pat. No. 4,463,371. The present invention seeks to provide a workpiece manipulating device useful to supply workpieces to a discharge conveyor and/or from a supply conveyor at spaced apart time intervals in a reliable fashion and in an operative relation with a support structure used to move a workpiece in a decorating machine. In this regard, it is necessary to provide a manipulative structure suitable to supply or receive a succession of workpieces from a support structure such as vacuum chuck which is part of the printing machinery used to present the workpieces in succession to printing stations from supply and delivering conveyance structures having fixed a plane of workpiece support. It is inadequate to require changes to the elevation of the conveyor belt used to support the workpiece because, among other things, the destruction to the synchronous relation between the operation of the manipulator apparatus and the conveyor and the receiving site for the workpiece by a vacuum chuck of the printing machine. The removal of a workpiece from the supply conveyor or the placement of a workpiece on a delivery conveyor requires a manipulative operation dependent upon the height of the workpiece on the conveyor as well as the transverse dimensions along the height of the workpiece. A glass tumbler and more dramatically, a glass stemware have width dimension properties that are dramatically different, not only transverse but also must be orientated during the manipulation procedure so that gripper arms can pass freely into and out of supporting contact. It is a typical and most desirable to transport a tumbler while vertically orientated to minimize space requirements but orientated horizontal for the decorating process.

Certain workpieces because of their configuration and material of construction, such as glass tumblers which are tall truncated cones with a flat bottom, must be moved with great precision from a carrier in a decorating machine to a delivery conveyor. Ever changing variables from glass tumbler to a glass tumbler include surface irregularities at the touch sites where the glass tumbler will be supported by the gripping members used to unload the workpiece. Also the glass tumbler should move along a path of travel that avoids the possibility of impact with the conveyor structure used to discharge the tumbler to the decorating machine. Impact must also be avoided with the tumbler while a retention device used to hold the tumbler mover to the discharge site from the decorating process. The avoidance of impact is particularly acute to satisfy necessary operation speeds for an acceptable through-put capacity of the decorating machine. Operator fatigue precludes the use of workers to unload workpieces, such as glass tumblers, from a decorating machine. Moreover, in a decorating machine using silk-screen printing techniques, after the screens are provided with an ink supply, the printing operations should proceed without extended periods of interruption. Printing delays due to down time of allied equipment allow an unwanted dispersement of printing medium through the silk-screen without extraction of the printing medium from screen by a workpiece. The matter is particularly acute when, for example, multiple colors are printed using multiple printing stations. When four different colors are being printed in a single decorating machine, each of the four different printing stations for the various colors must be subject to a clean-up operation before the decorating machine can be placed back on a production basis. Restarting the printing operation after a delay requires cleaning smeared printing from workpieces which is very labor intensive.

In our co-pending patent application Ser. No. 07/771,638, Filed Oct. 4, 1991, there is disclosed an apparatus to load workpieces on a carrier for a decorator. The apparatus includes a conveyor to deliver a workpiece to a transfer site, a gripper including a displaceable gripper movable relative to a stationary gripper for supporting a workpiece at the discharge site, a swing arm supporting the gripper at one end thereof for movement between the workpiece transfer site and a workpiece loading position, an actuating lever movable with the swing arm for moving the displaceable gripper into a workpiece release position with the stationary gripper at the workpiece loading position, a drive coupled to the end of the swing arm opposite the gripper for reciprocating the swing arm between a workpiece receiving position and a workpiece discharge position, and cam drive to synchronize the operation of the drive for reciprocating the swing arm and the actuating lever for moving the displaceable gripper.

In such a loading system workpieces can be presented to a support structure of a decorating machine through the operation of the grippers and operation of the drive mechanism necessary to translate the gripper from the workpiece receiving position and a workpiece discharge position. In this loading mechanism the workpieces are always received at a designated workpiece receiving site that is fixed in relation to all other structure of the decorating machine so that there is no need to undergo costly and time consuming setup operations to accommodate changes from one dimensional characteristic workpiece to a different dimensional characteristic workpiece. When converting, for example, from one glass tumbler size to a different glass tumbler size, the gripper arms are adjusted to bring them into suitable gripping relation with the workpiece but there is no need to reposition the conveyor with respect to the support structure of the decorating machine for the workpiece to accommodate the change to the size of the workpiece. This is because the workpiece is engaged at a predetermined distance from the support surface of the conveyor and this predetermined distance remains uniform throughout the transporting operation to lift and transport the workpiece from the conveyor to the support structure for the decorating machine. The support structure in turn always receives the workpiece while the gripper arm is engaged with the workpiece at a never changing relation from the edge or rim of the workpiece by which it will be supported by the support structure for the decorating machine.

The present invention provides a manipulator structure that will solve the problem of loading and/or unloading workpiece in a decorating machine wherein there exists selective positioning of a gripping structure as an operative unit to accommodate workpieces of a variety of shapes and varying dimensions as an incident to the decorating process and in conjunction with a conveyor operative at a fixed, predetermined elevation. The loading operation and the unloading operation require suitable structure to accommodate the widely varying height dimensions of a given line of products to be processed on the decorating machine. While the manipulating apparatus for the loading operation may receive a workpiece while supported on the rim structure of the workpiece preference or other considerations may dictate that the workpiece be supported on its conventional bottom. Thus, there will no longer exist a fixed and predetermined dimensional relation between the gripper at the rim of the workpiece by which is will be presented for support to a vacuum chuck by the manipulated structure. A similar relation also exists on the unloading phase of the decorating process wherein the dimensional relation between the workpiece as presented to an unloading structure changes with the height of the workpiece so that it is necessary to accommodate the varying height when depositing the workpiece on a conveyor. The dimensioned relationship between the gripper at the support site and the base of the workpiece changes from the size of the workpiece and so does the dimensional relationship between the gripping site and the surface of the workpiece by which it will be supported during conveyance during unloading.

SUMMARY OF THE INVENTION

It is an object of the present invention to provide a manipulative apparatus to handle workpieces for either or both of the supply and unloading of workpieces from a decorating machine wherein the manipulative apparatus is constructed and arranged to establish a predetermined dimensional relationship between a surface by which the workpiece is or will be supported and the surface which is to support the workpiece at the conclusion of the manipulative operation.

More particularly, according to the present invention there is provided an apparatus to manipulate workpieces incident to a decorating operation, the apparatus including the combination of means for delivering a workpiece to a workpiece receiving site, gripper means including at least one displaceable gripper for supporting a workpiece at the workpiece receiving site, pivot means supporting the gripper means for movement between the workpiece receiving site and a workpiece transfer site, means for moving the displaceable gripper into a workpiece gripping position and for moving the displaceable gripper into a workpiece release position at the workpiece transfer site, means for conveying the workpiece at the workpiece transfer site, and means operative to horizontally position the pivot for compensating for varying lengths of workpieces.

BRIEF DESCRIPTION OF THE DRAWINGS

These features and advantages of the present invention as well as others will be more fully understood when the following description is read in light of the accompanying drawings in which.

DETAILED DESCRIPTION OF THE PREFERRED EMBODIMENTS

Figure 1:
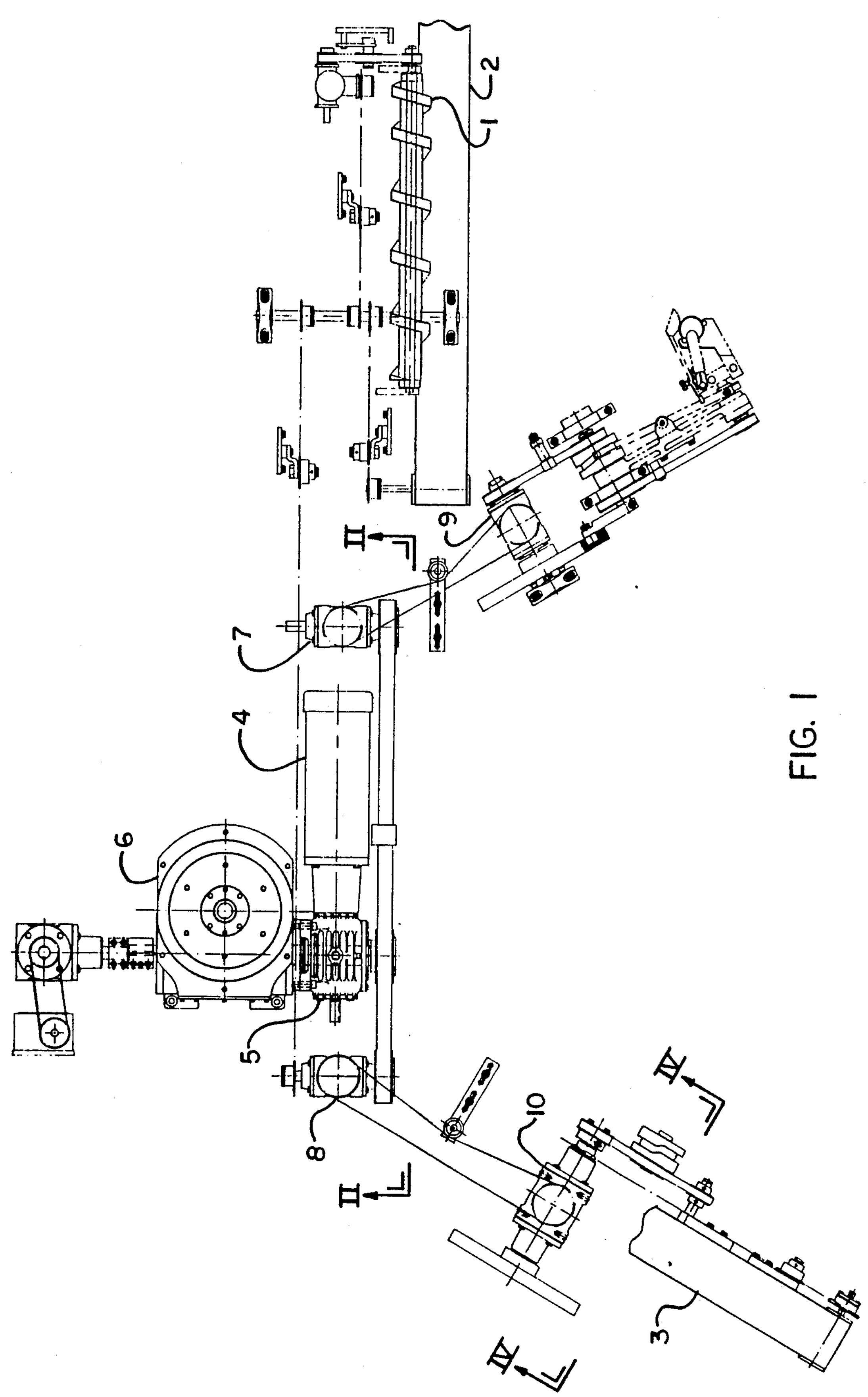
FIG. 1 is a plan view schematically illustrating the manipulating apparatus in the drive system for the entire decorating process according to the present invention.
Figure 3:
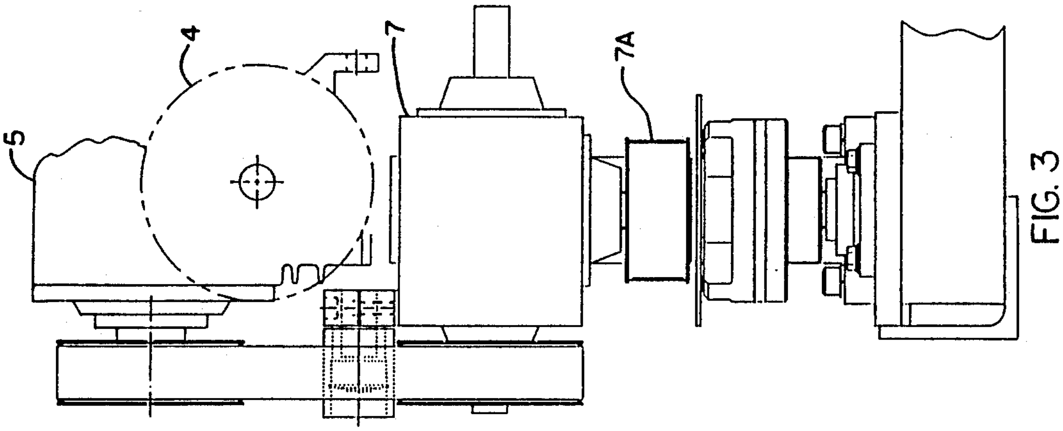
FIG. 3 is a elevational view taken along lines III—III of FIG. 2.
Figure 2:
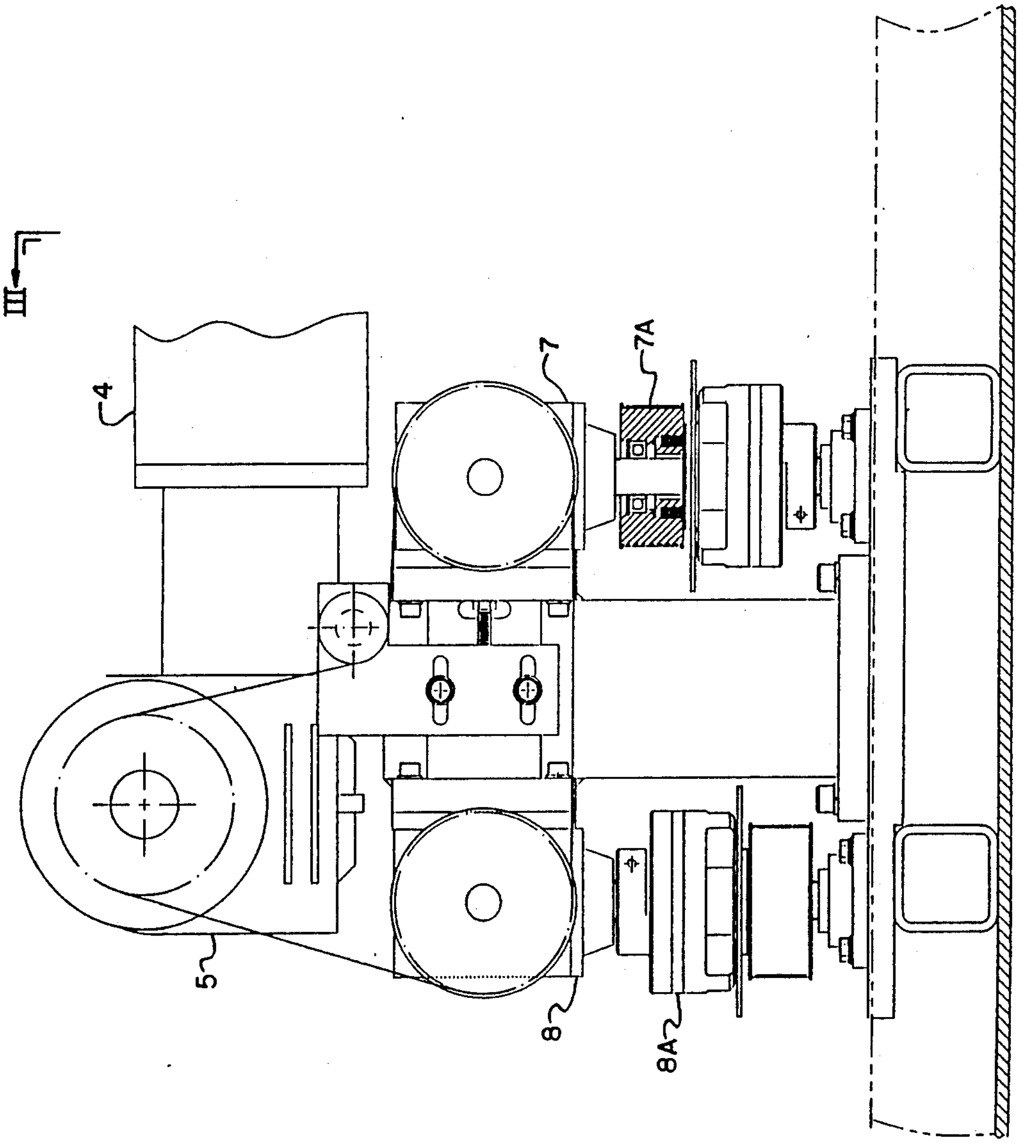
FIG. 2 is an elevational view taken along lines II—II of FIG. 1.

In FIGS. 1, 2 and 3 there is illustrated the arrangement of machinery for supplying, decorating and discharging workpieces forming part of the present invention. In the printing process of the apparatus of the present invention, there is a constant timed relationship between all movements of the workpiece, hereinafter called tumbler for convenience, commencing with the advancement of the workpiece by a timing lead screw 1 on a conveyor 2 and ending with depositing of the tumbler on a delivery conveyor 3. The timed relation exists by virtue of the fact that a single drive motor 4 is used for the entire decorating system. The motor 4 is mounted on the side of gear drive 5. The gear drive has one output coupled to an indexing turret drive 6 having an output shaft by which other drives are supplied with power for the printing operations. The gear drive 5 has a second output shaft provided with a pulley that is in turn coupled by a belt to two spaced apart gear drives 7 and 8. Gear drive 7 has multiple output shafts, one of which provides a power take-off system to operate the timing lead screw 1 as well as the belt conveyor 2. A second power take-off from gear drive 7 is coupled by a belt to a gear drive 9 which forms part of a loading drive apparatus incorporating a manipulating device according to the present invention. Gear drive 8 is connected by a belt to a gear drive 10 which is part of an unloading apparatus including a manipulating apparatus according to the present invention. It is to be understood, however, that the manipulating apparatus may be applied to either the loading system or the unloading system for tumblers or both systems. In FIG. 2, a drive output shaft for each of the gear drives 7 and 8 is coupled to a overload clutches 7A and 8A, respectively, with the output element of the overload clutch being coupled to a drive pulley. The overload clutches are protective elements in the drive system to avoid overloading the drive in the event of a jam or misfeeding of tumblers T.

In FIGS. 4–8 there is illustrated a preferred embodiment of a manipulator apparatus which will be described for descriptive purposes only for an unloading operation for tumblers from vacuum chucks of a printing machine. A foundation base 11 carries turret drive 6 which indexes a turret plate 12 in a manner per se well known in the art. The turret plate supports at each of angularly spaced apart sites a support structure including a vacuum chuck 13 used to releasably support a tumbler T, in a manner per se well know in the art. The vacuum chuck is rotated about an axis 14 inclined to the horizontal at a shallow angle, for example, at 4° so that the truncated conical surface of the workpiece is presented horizontally to the printing stations for the printing operation by the use of silk screen printing techniques. When the workpiece surface to receive printing is cylindrical, which will rotate about a horizontal axis. When the printing operation includes decorations involving more than one color, than multiple printing stations are situated about the periphery of the turret plate 12. The workpieces are carried from the last of the printing stations to a unloading position established by the operation turret drive 6 to stop rotary movement of the turret.

Figure 4:
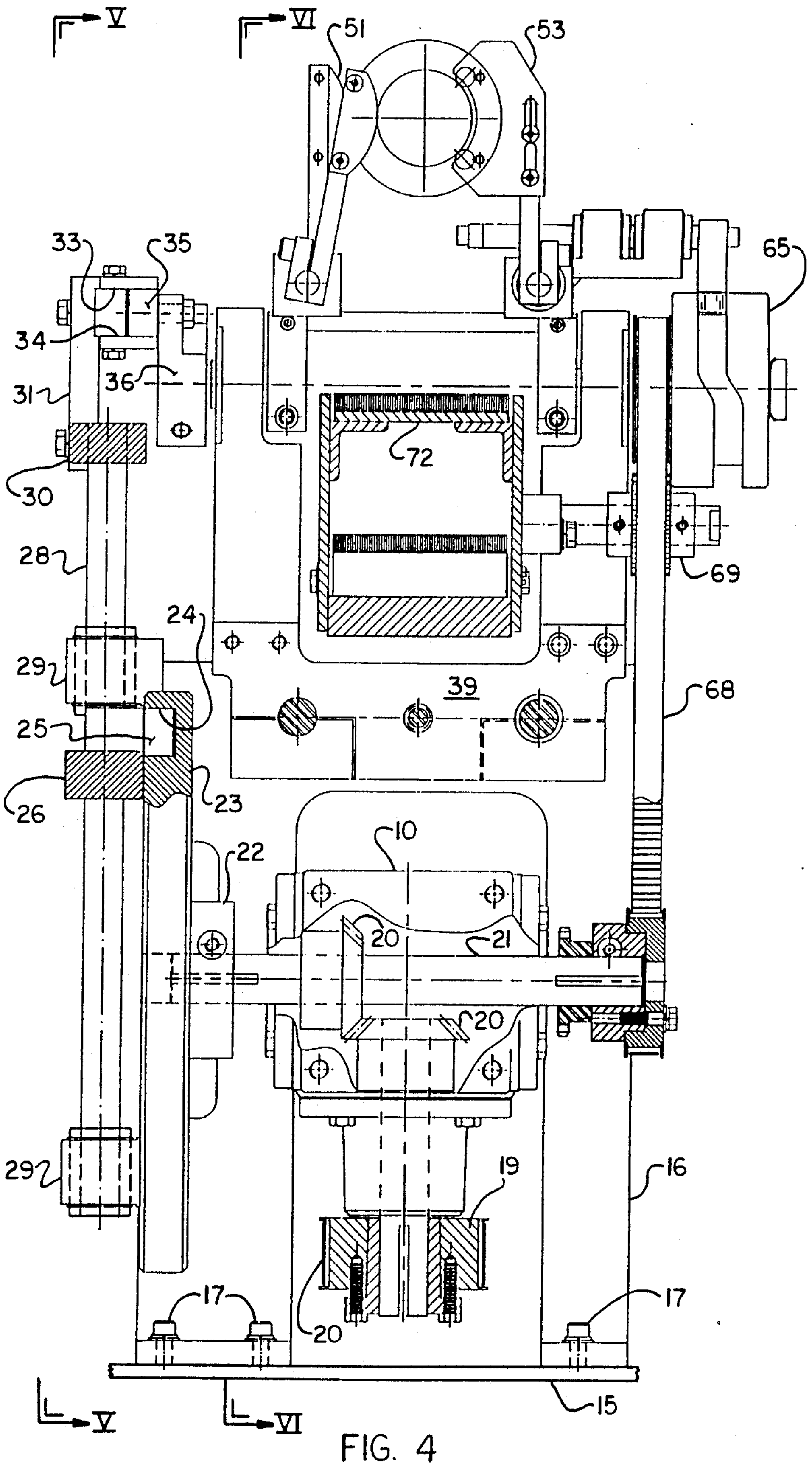
FIG. 4 is an elevational view in section taken along lines IV—IV of FIG. 1.
Figure 8:
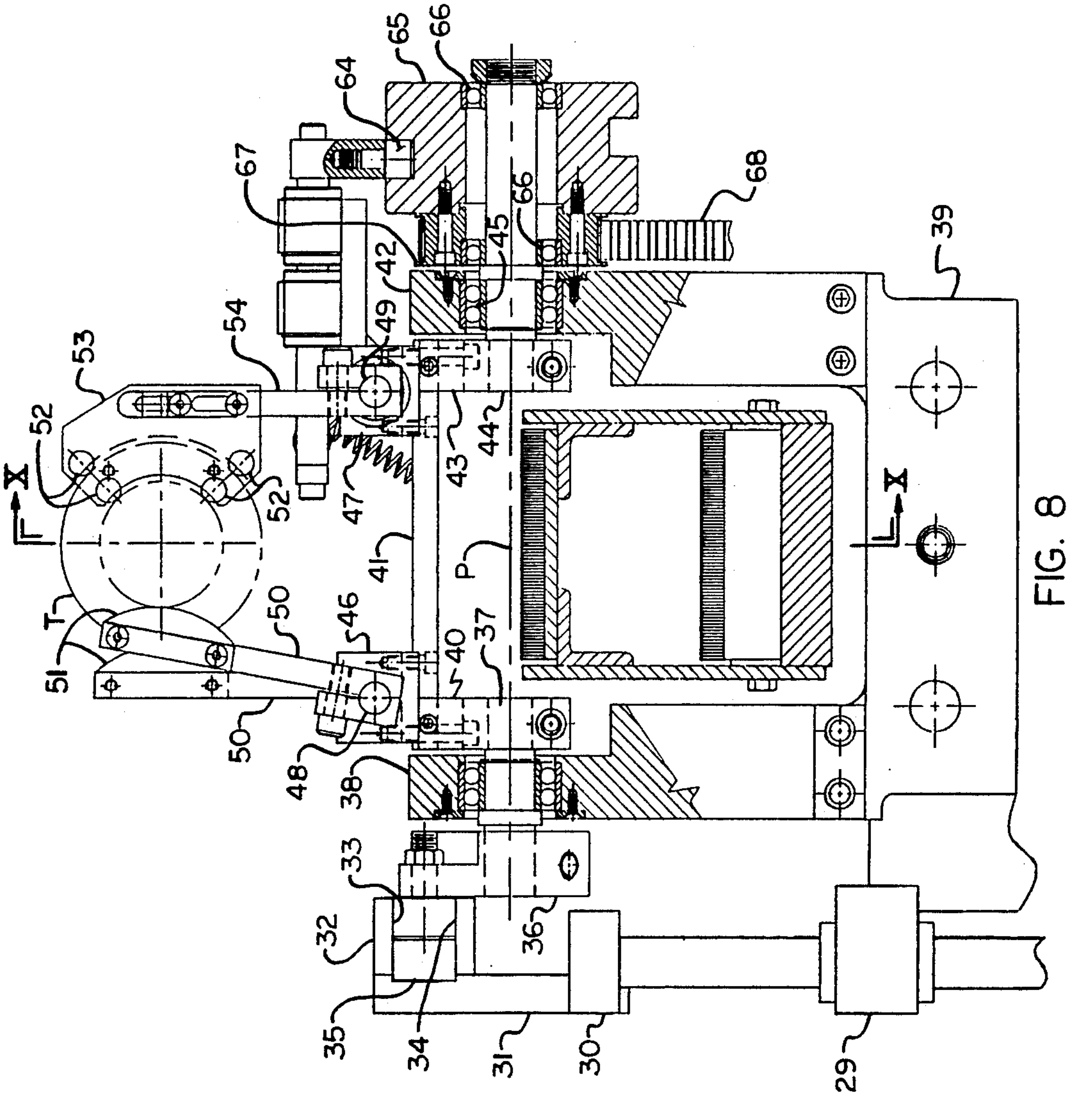
FIG. 8 is an enlarged view similar to FIG. 4 of the upper portion of the workpiece manipulation apparatus of the present invention.
Figure 9:
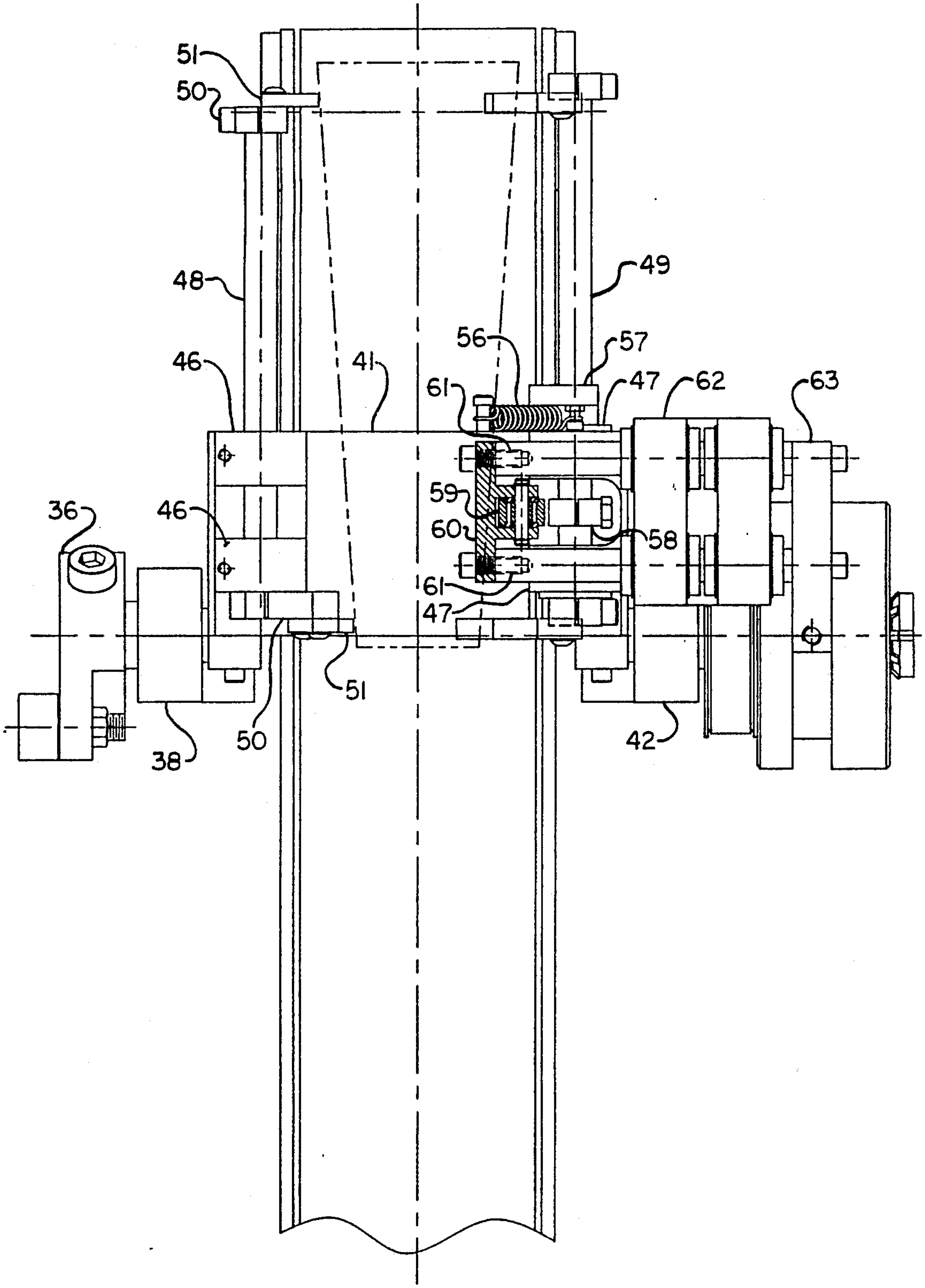
FIG. 9 is an enlarged plan view of the apparatus shown in FIG. 8.
Figure 10:
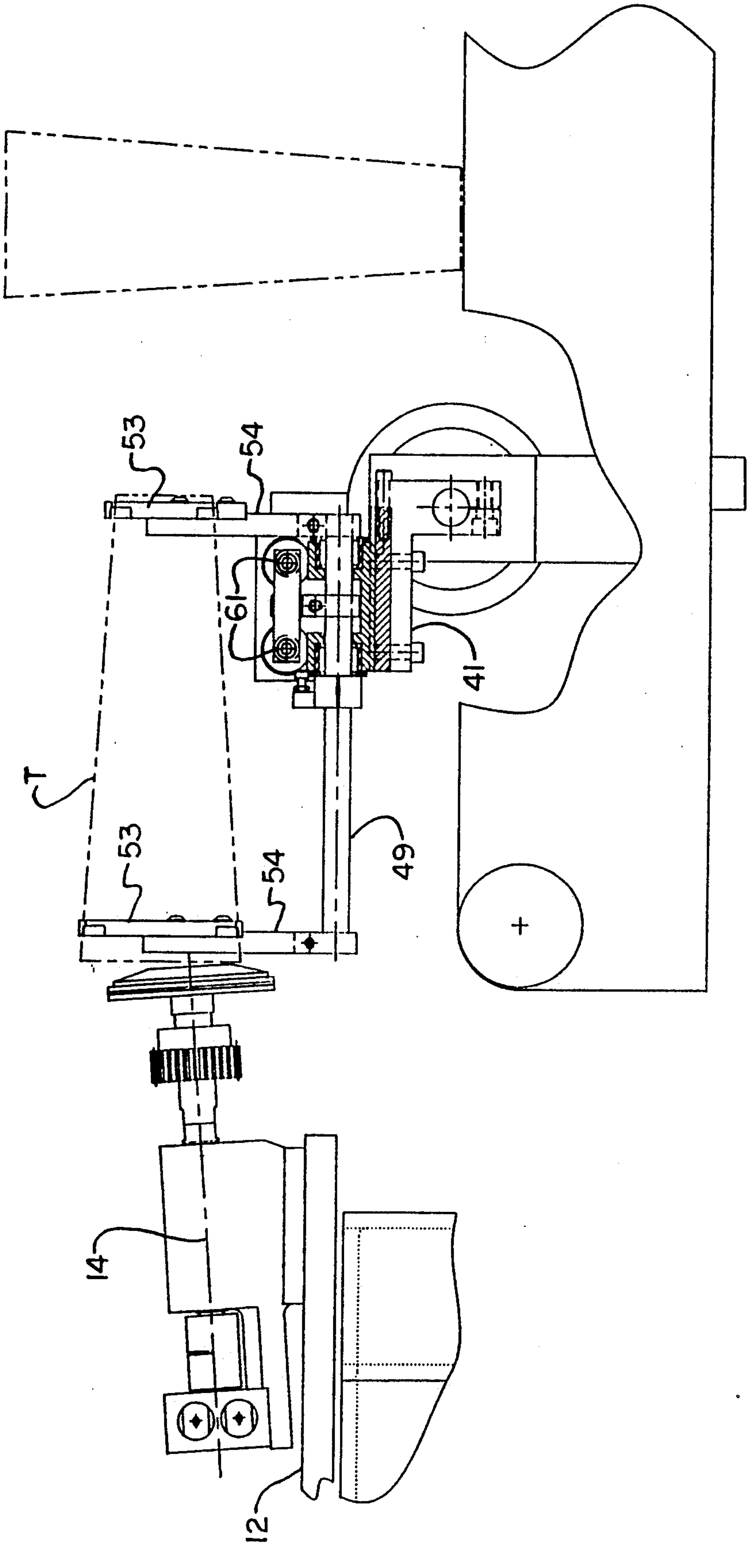
FIG. 10 is an enlarged side elevational view taken along lines X—X of FIG. 8.

At the discharge station there is located an manipulator apparatus that is supported by a sub-base 15 extending to the foundation base 10. The sub-base supports an upstanding housing 16 which is attached to the sub-base by bolts 17. The housing 16 supports the gear drive 10 having a pulley 18 secured to the drive input shaft thereof. The pulley 18 is driven by a belt 19 extending to a pulley on the output shaft of gear drive 8 (FIG. 1). The gear drive 10, as shown in FIG. 4, includes within a drive housing, miter gears 20 that are driven by an output shaft 21. Shaft 21 is secured to a flange 22 which is in turn mounted to the face surface of cam plate 23. Machined into an outwardly directed face surface of the cam plate is a cam track 24 which receives a follower roller 25 carried by a bearing block that is in turn mounted to a yoke bar 26. The yoke bar is connected by screw operated clamps 27 at its opposite ends to spaced apart vertically arranged actuator rods 28. The actuator rods are supported by linear bearings 29 above and below the yoke bar 26 for reciprocating movement of the actuator rods 28 in response to motion imparted to the bar 26 by the follower 25 in the cam track 24. The upper ends of the actuator bars 28 are joined together by a tie bar 30 to which a raiser plate 31 is secured and in turn supports a horizontally arranged linear raceway defined by a "U" shape channel section 32. Between the actuator surfaces 33 and 34 of the channel section 32 there is received an actuator roller 35 mounted on one end of a crank arm 36 secured to pivot shaft 37 rotatably supported by an anti-friction bearing in one leg 38 of a U-shaped yoke 39. As best shown in FIG. 8, a clamp block 40 is secured to the end of shaft 37 protruding beyond the bearing in leg 38. The clamp bock 40 is mounted onto the underside of a drive platform 41 transverse the gap between leg 38 and an opposing leg 42 comprising yoke 39. Adjacent leg 42 is a clamp block 43 mounted onto the underside of the drive platform and secured to for establishing a driving relation with a shaft 44. Shaft 44 is rotatably supported by anti-friction bearings 45 in leg 42 of the U-shaped yoke 39. Shafts 37 and 44 pivot in the bearing supports about a common pivot axis P. Mounted on the side of drive platform 41 opposite to blocks 40 and 43 at spaced apart locations are pairs of support blocks 46 and 47. Mounted by support blocks 46 is a rod 48 and mounted by support blocks 47 is a rod 49. As best shown in FIGS. 8–10, rod 48 supports at arms 50 opposite sides of blocks 46. Each of the arms 50 is provided with a gripper pad 51. The arms 50 are positioned and spaced apart by a distance along the rod 48 such that the respective gripper pads 51 can engage a workpiece at correspondingly spaced apart touch sites situated on one side of the tumbler T. These touch sites are opposite to touch sites formed by elastomer rods 52 mounted in the cavities of a C-shaped gripper heads 53. The gripper heads have slotted openings to adjustably mounting by fasteners onto individual control arms 54 having a clamp block 55 by which each arm is secured to rod 49.

The moveable gripper arms are urged by a resilient force supplied by a spring 56 which is connected between the platform 41 and rod 49 by way of a lever arm 57 to impose sufficient pressure on the tumbler to establish a gripper force to hold the tumbler between the opposed gripper arms while the tumbler is manipulated between the vacuum chuck and the conveyor. The tumbler is released from the gripping force and the moveable gripper arms are swung away from the tumbler through the operation of a release mechanism which can be best seen in FIGS. 9 and 10. The release mechanism includes a lever 58 secured to rod 49 in an upstanding fashion which is directly opposite to an actuator roller 59 that is supported by a clevis mounting 60 affixed by bolts to the ends of parallel push rods 61. The push rods are supported by linear bearings carried by a housing 62. In the free ends of the push rods protruding from the bearings are joined to a cross head 63. The cross head supports a follower roller 64 in a manner to engage in a cam track formed in a cam roller 65. The cam roller is supported for rotatory movement by spaced apart anti-friction bearings 66 mounted on shaft 44. Joined to the cam roller 65 and supported by one of the bearings 66 is a pulley 67 having a toothed surface engaged with the teeth on a belt 68 which extends along the U-shaped housing 39 downwardly and into a driving relation with a pulley mounted on shaft 21 of the drive gear 10 (FIG. 4).

Figure 5:
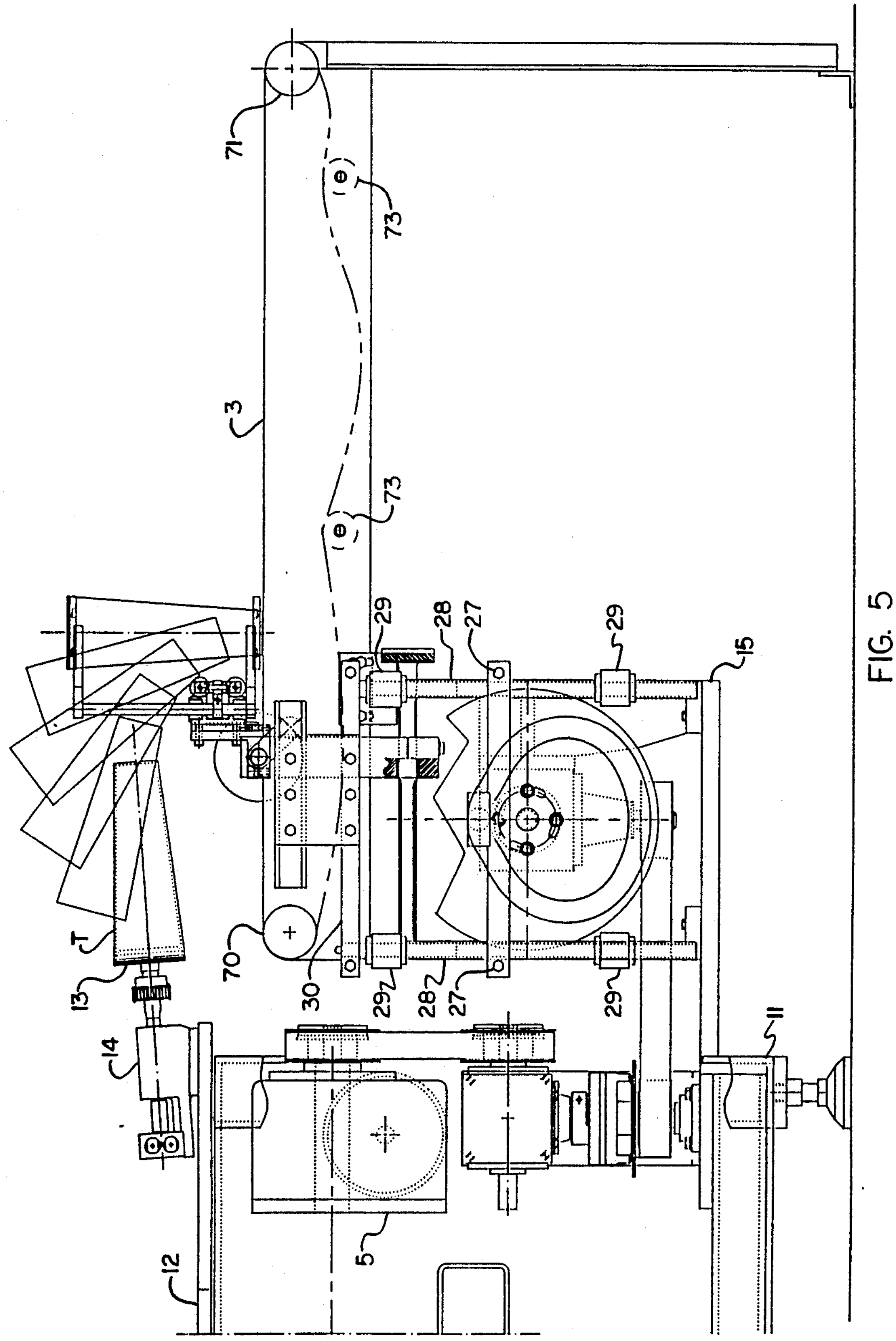
FIG. 5 is an elevational view taken along lies V—V of FIG. 4.
Figure 7:
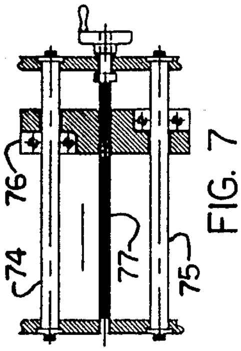
FIG. 7 is a sectional view taken along lines VII—VII of FIG. 6.
Figure 6:
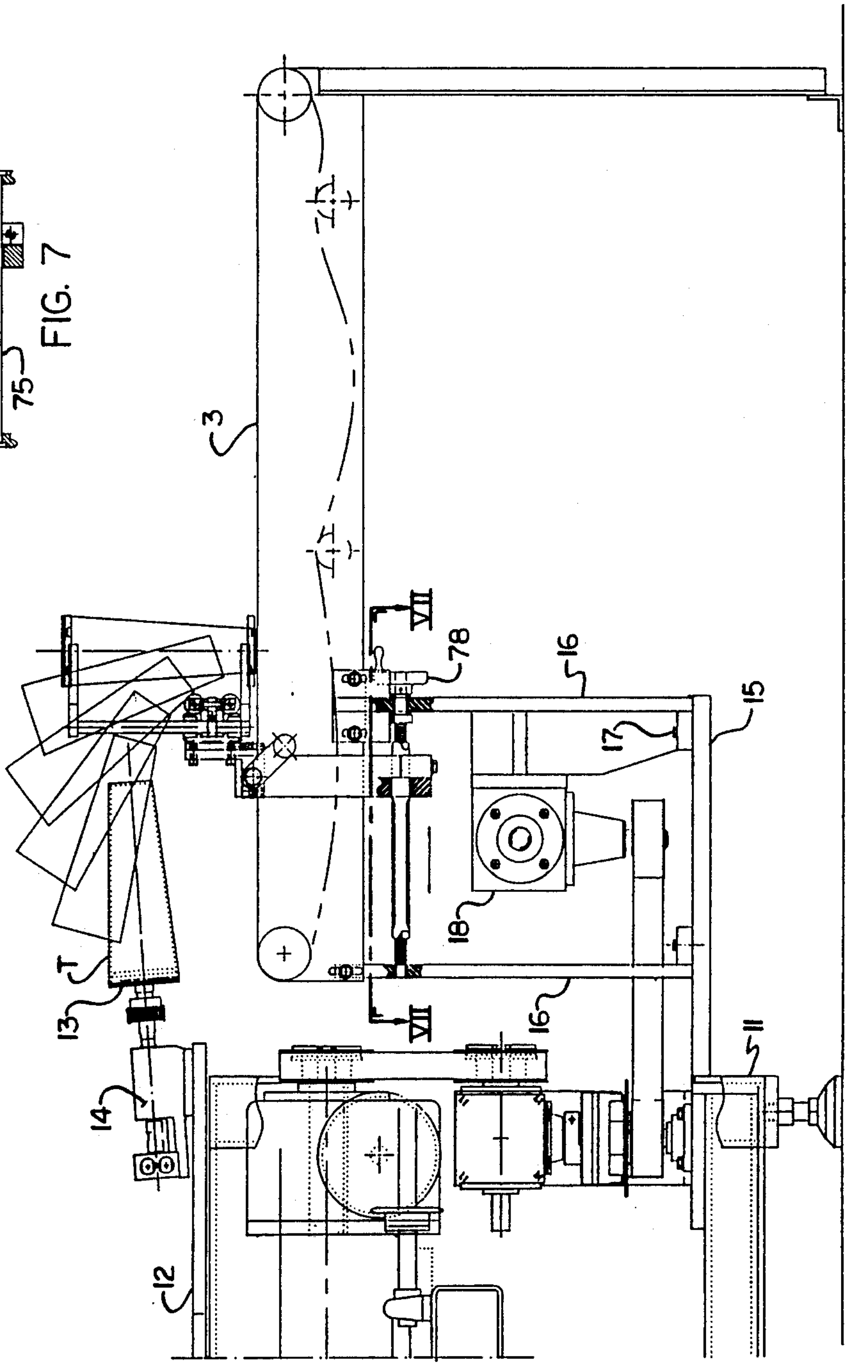
FIG. 6 is an elevational view similar to FIG. 5 but taken along lines VI—VI of FIG. 4.

As best shown in FIGS. 5 and 6 the conveyor belt 3 extends between rollers 70 and 71. The belt 3 forms spaced apart feed and return runs of the belt extending in the space between legs 38 and 42 of the U-shaped yoke 39. The upper run of the conveyor belt is stabilized by a base plate 72, whereas the lower run is supported by spaced apart rollers 73.

A feature of the present invention is the provision of a construction to allow the pivot which is part of the support structure for the gripper arms to be moved toward and away from the vacuum chuck in a horizontal direction to compensate for varying lengths of workpieces while the workpiece is manipulated from a receiving position where it is receiving from the vacuum chuck into a release position where the weight of the tumbler is transferred to the conveyor 3. For this purpose yoke 39, as best shown in FIGS. 4, 5, 6 and 7, is provided with spaced apart horizontal bores into which there are received guide rods 74 and 75. Counter bored portions in the cross heads provide sites for receiving clamps 76 that are operated by a threaded fastener to affix the cross head to the support bars once the cross head has been positioned through operation of a feed screw 77. The feed screw is engaged in a threaded opening formed in the cross head and arranged parallel to the guide rods 74 and 75. The ends of the guide rods and the feed screw are supported by spaced apart walls of the upstanding housing 16. The feed screw has an end portion protruding from a walls where it is fastened to a hand wheel 78. By operation of the head wheel, once the clamps are released, the feed screw operates to move the U-shaped yoke horizontally so that when the gripper arms engage the tumbler, they will be so positioned in relation to the bottom of the tumbler that the tumbler can be manipulated from the chuck to the conveyor. The manipulative movement terminates as the bottom of the tumbler rests without impact on the conveyor.

Figure 6A:
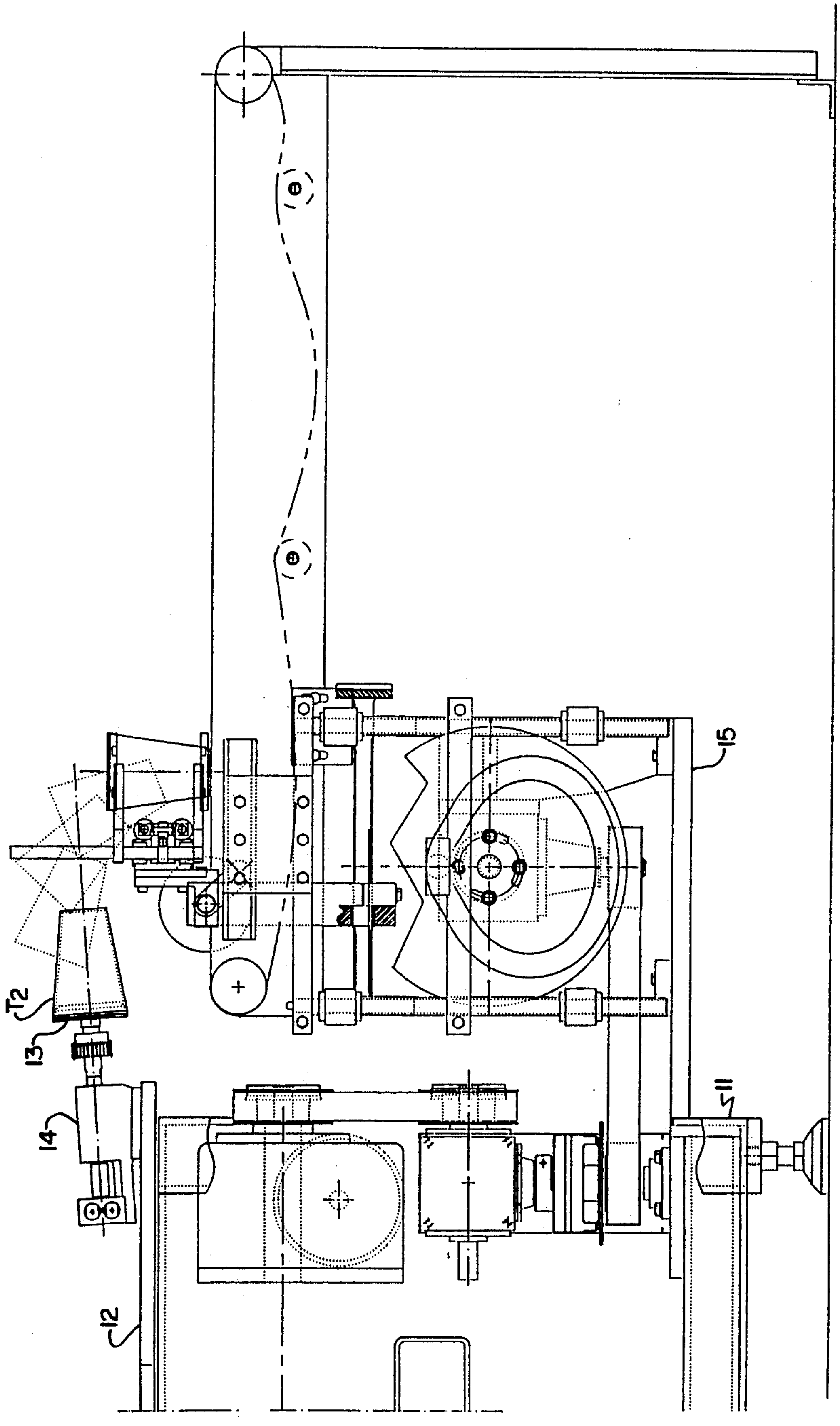
FIG. 6A is a view similar to FIG. 6 and illustrating the operation of the manipulating apparatus for workpieces having a short height as compared with tall workpieces shown in FIG. 6.

In FIG. 3 the yoke is shown in a position where it is most remote in a horizontal direction from the chuck 13. In this relation the tumbler T has a greatly extended height. On the other hand, when a tumbler is short as compared with the height of the tumbler shown in FIG. 6, pivot axis P and the U-shaped yoke is advanced toward the chuck into a relationship shown in FIG. 6A where a tumbler $T_2$ is shown in a manipulative position between the chuck 13 and the conveyor. In order to accommodate the translating motion of the pivotal axis P and its support drive structure, it is necessary to maintain a timed relation between the operation of the gripper arms and their pivotal movement. Each run of the belt between the pulley 67 and the drive pulley on gear drive 10 passes about horizontally spaced apart, phase adjusting pulleys 69 which are rotatably supported by the upstanding housing. The pulleys 69 are an adjustably positioned horizontally to consistently maintain a predetermined timed relation between the cam plate 23 and cam roller 65. This is because as the U-shaped yoke is moved linerally, pulley 67 undergoes an angular change with respect to the drive pulley on gear drive 10.

The manipulative operation for transporting a tumbler from a generally horizontal orientation into a generally vertical orientation occurs through pivotal movement of shafts 37 and 44 which are tied together by drive platform 41. Shaft 37 is moved through an arcuate movement by vertical displacement of the channel section 32 in response to reciprocating movement by actuator rods 28. Rods 28 are controlled by the configuration of the cam track 24 to displace the follower 25 by rotation of the cam plate 23.

Figure 11:
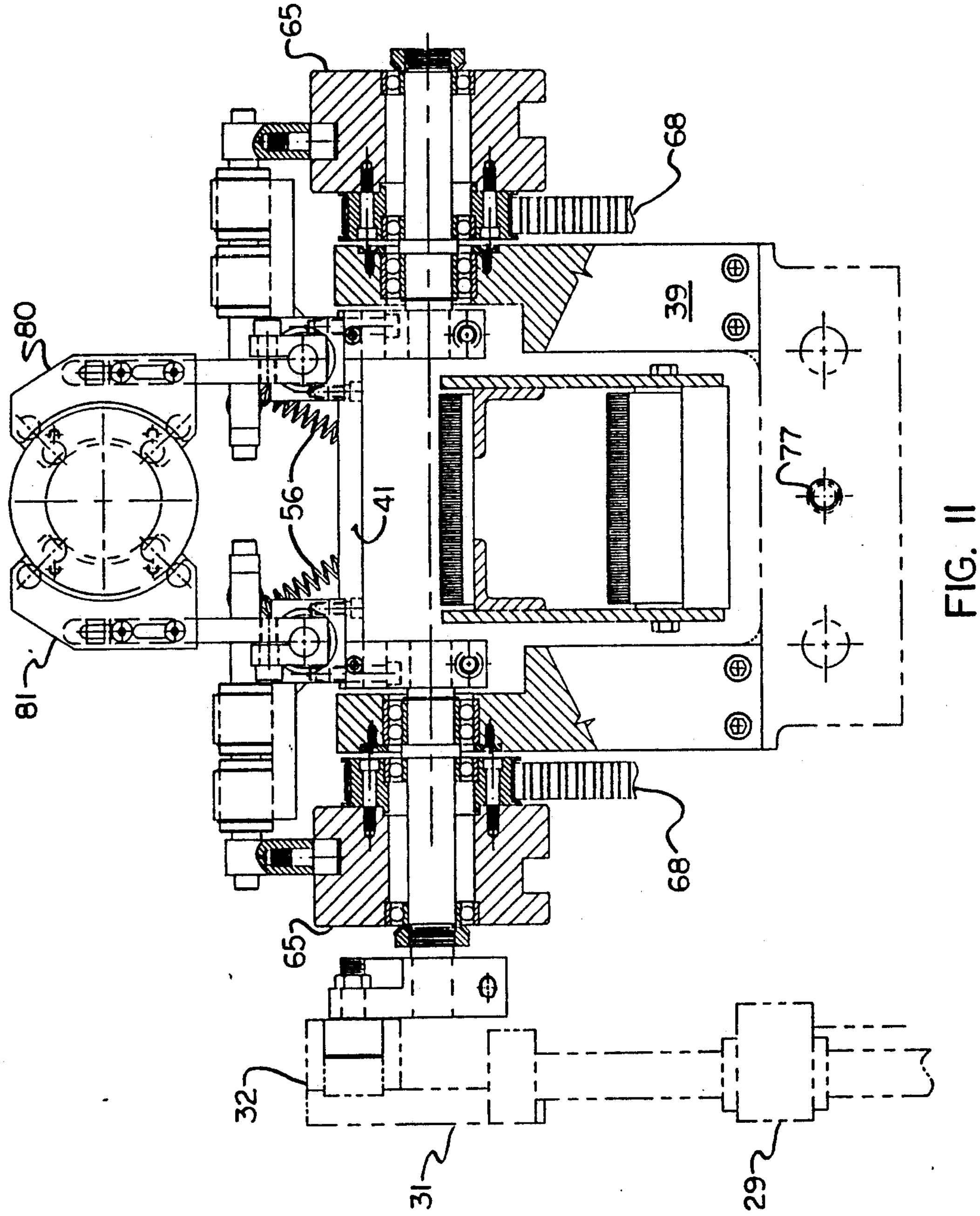
FIG. 11 is an elevational view in section similar to FIG. 8 and illustrating a modification of the gripper mechanism to enable movement of opposed gripper arms relative to a workpiece.

In FIG. 11 there is illustrated a modification to the preferred embodiment of the present invention to accommodate, when necessary or desired, the need to retract the grippers from both of opposite sides of a workpiece. Such a need occurs, for example, when the workpiece supported by a vacuum chuck in a presents a cantilever portion of the workpiece that is larger in diameter than the diameter engaged with the chuck. Thus in order to pass into a position where the arms can be brought into supporting contact with the workpiece, both arms must be separated by a operating clearance. In FIG. 11, the arms which engage with opposite sides of the workpiece are constructed identically and in the same manner as already described with respect to the moveable gripper arms hereinbefore.

Figure 12:
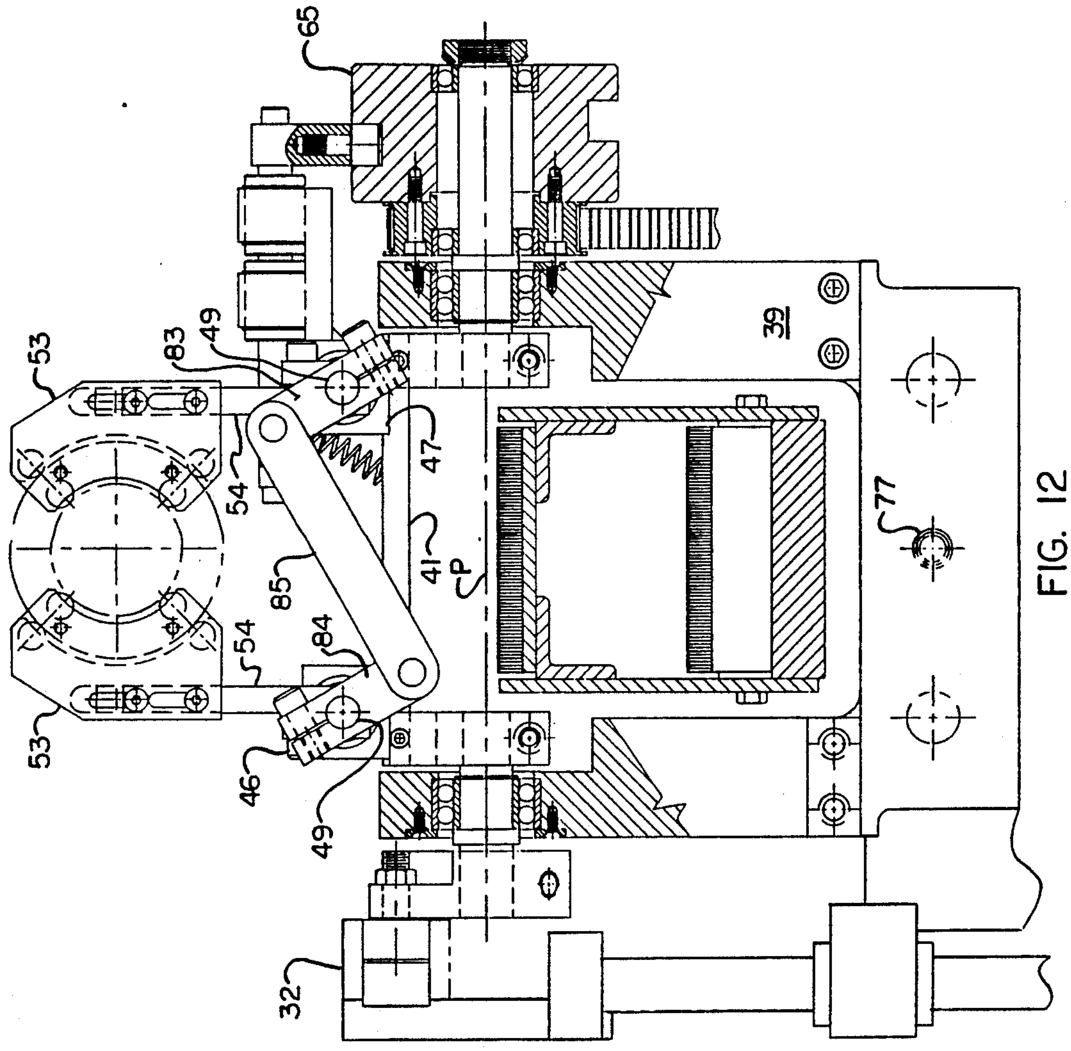
FIG. 12 is an elevational view in section similar to FIG. 8 and illustrating a further embodiment of apparatus for moving both grippers relative to a workpiece.

In FIG. 11, the workpiece takes the form of stemware in which an enlarged support base is located in cantilevered fashion horizontally from the vacuum chuck. The container body of the stemware is engaged at opposite sides by moveable grippers 80 and 81. Both of the moveable gripper arms are operated by cam rollers 65 in the same manner already described in the preferred embodiment. The difference being that at opposite sides of the workpieces identical assemblage of parts are provided to operate the gripper arms. A more simplified construction of parts to operate movable gripper arms at opposite sides of glassware is shown in FIG. 12. In this embodiment the movable gripper arms are supported, in a manner as previously described by pivot rods 49 coupled together by a linkage comprised of mounting links 83 and 84. Each mounted link is provided with a clamp screw to securely fasten the link to the rod. The clamp arms are provided with pivot shafts interconnected by a link 85 in a manner so that pivotal movement of rod 49 at one side of the workpiece brings about a transfer of pivotal motion by the linkage mechanism to the rod 49 at the other side of the workpiece.

This arrangement of parts obviates the need to provide drive mechanisms at each of at both sides of the workpiece to operate each of the pivotal arms.

Figure 13:
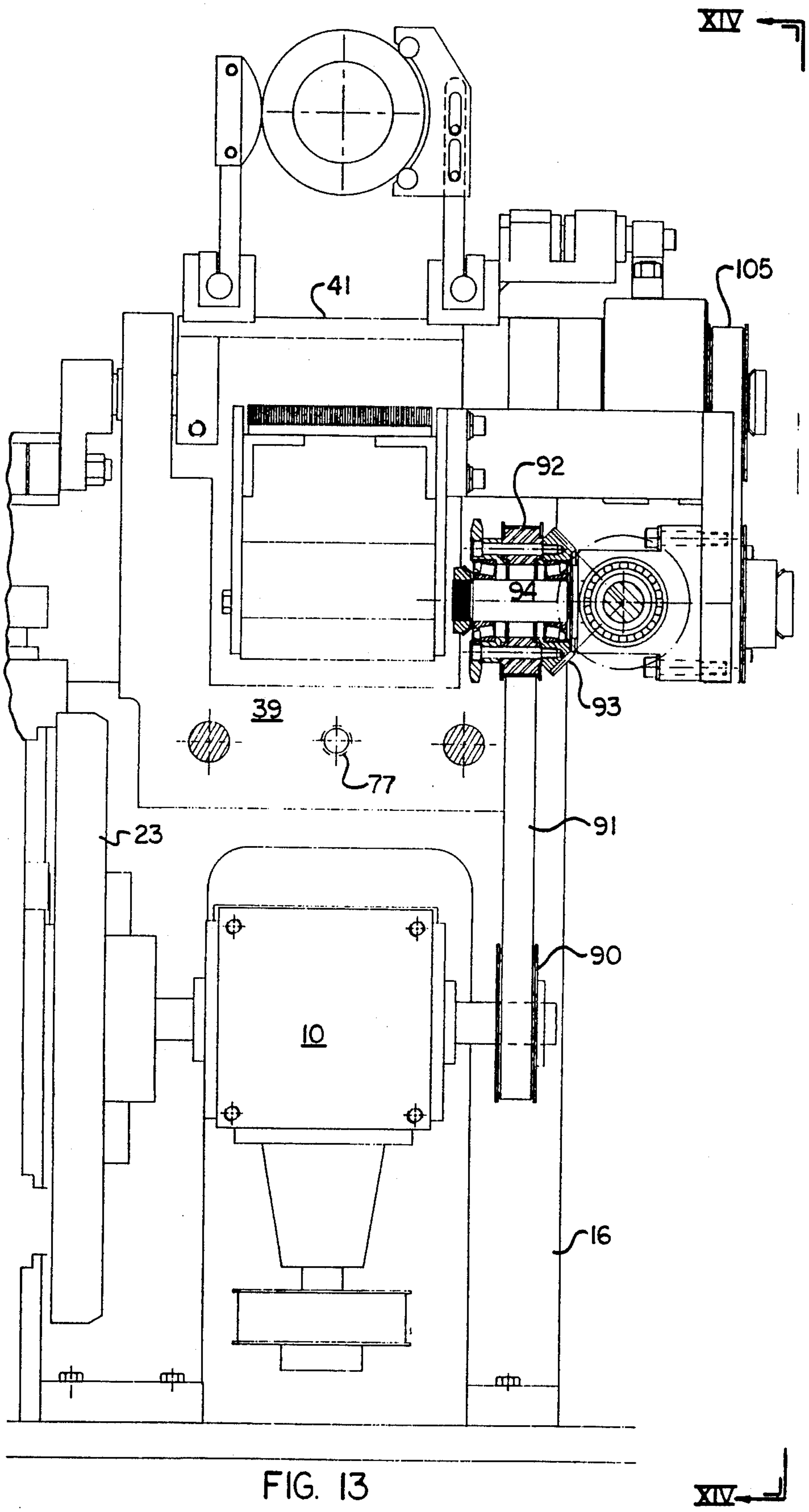
FIG. 13 is a elevational view similar to FIG. 4 illustrating a further modification of the present invention addressed to maintaining a synchronous relation between movement of the workpiece arms and a movable carriage in relation to operation of the printing apparatus.
Figure 14:
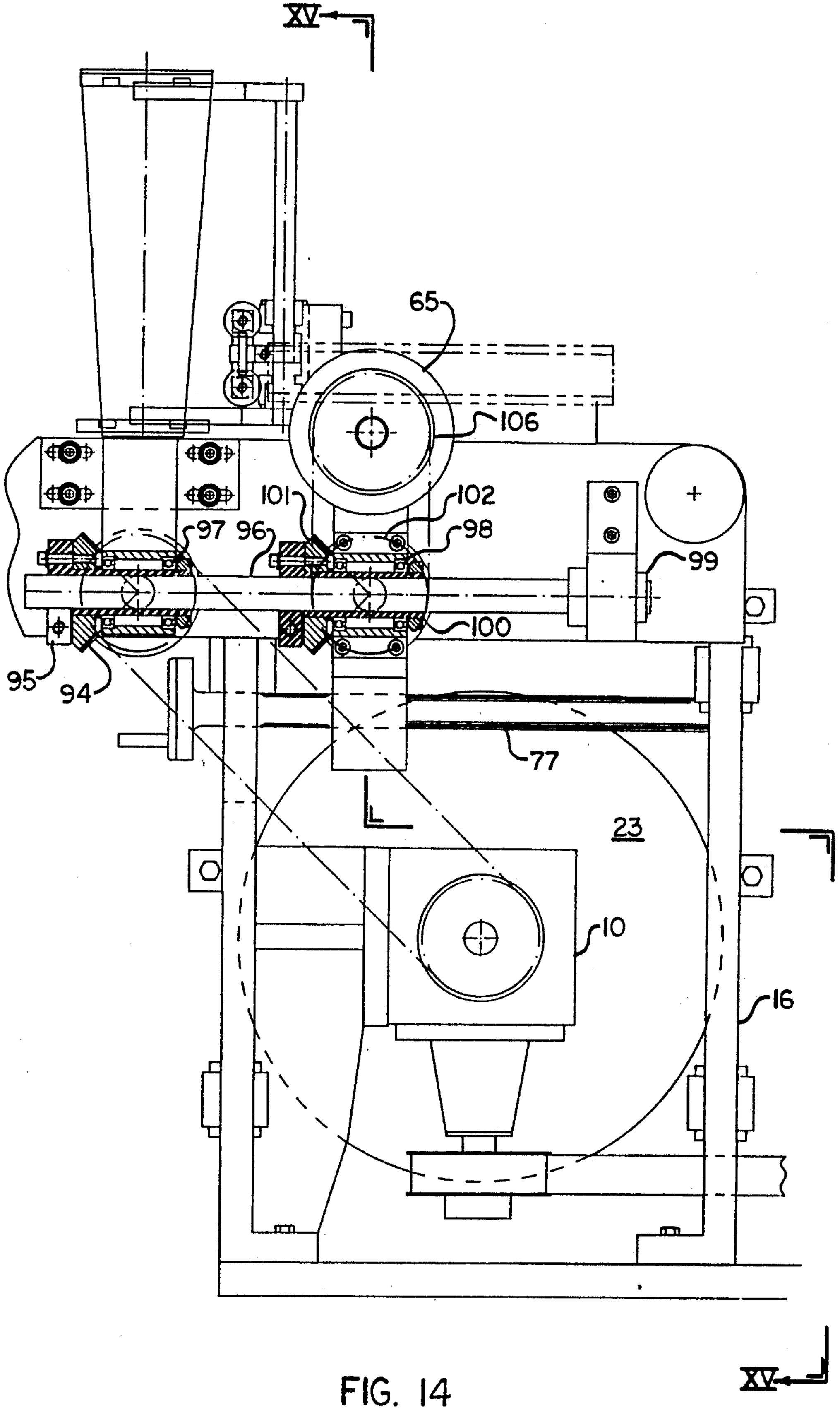
FIG. 14 is a side elevational view taken along lines XIV—XIV of FIG. 13.
Figure 15:
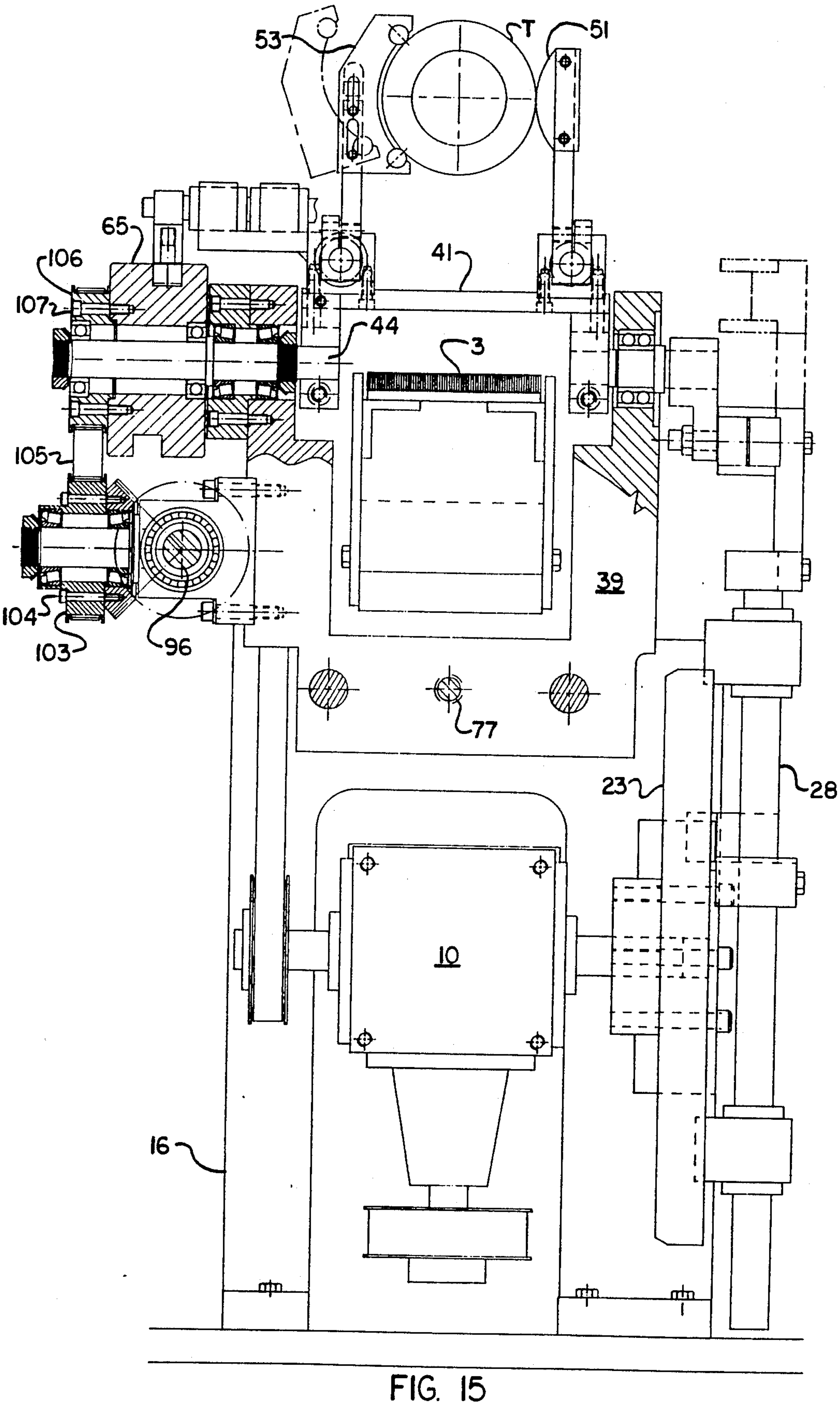
FIG. 15 is an elevational view in section taken along lines XV—XV of FIG. 14.

In FIGS. 13, 14 and 15 there is illustrated a further modification to the preferred embodiment of the apparatus in which the need to compensate for phase adjustments occurring when the U-shaped housing is used horizontally towards and away from the vacuum chuck is obviated. In this construction the gear drive 10 is provided with a pulley 90. A belt 91 extends to a drive pulley 92 which is bolted to an exposed face of a beveled gear 93. The beveled gear is rotatably supported by bearings on a shaft 94. Beveled gear 93 meshes with a beveled gear 94 and is supported on a flanged sleeve 95 that is drivingly secured to a shaft 96 supported by bearings 97 at spaced apart locations along the length of the shaft. The bearings 97 at opposite ends of the shaft 97 and 99 are engaged through brackets extending from the side parts of the conveyor structure whereas the bearing 98 is supported by an outwardly extending bracket from the U-shaped housing. Anti-friction bearings 98 are mounted on a flanged sleeve 100 which is in turn clamped to shaft 96 to rotate therewith. Bolted to the flange sleeve is a beveled gear 101 which in turn meshes with a beveled gear 102 that is secured to a pulley 103 by bolts 104. The pulley 103 engages a belt 105 that extends to a pulley 106 that is attached by bolts 107 to cam roller 65.

In the operation of the apparatus, the movement of the U-shaped frame to and fro through operation of the threaded screw 77 displaces the flanged sleeve along shaft 96. When the desired horizontal positioning of the pivot axis P for the support arms is attained, the threaded fastener is tightened to establish a driving relation between the flange collar 100 and shaft 96. This arrangement of parts offers the advantage that timed relation between the pivotal movement of the manipulator and the gripping movement of the support arms is undisturbed during changes to the position of the pivotal axis.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

We claim:

1. An apparatus to manipulate workpieces, the apparatus including the combination of:

means for delivering a workpiece at a first orientation to a workpiece receiving site;

gripper means including at least one displaceable gripper for supporting a workpiece at the workpiece receiving site;

pivot means supporting the gripper means for movement between the workpiece receiving site and a workpiece transfer site;

means for moving the displacement gripper into a workpiece gripping position and for moving the displaceable gripper into a workpiece release position at the workpiece transfer site thereby changing the workpiece orientation;

means for conveying the workpiece in a second orientation at the workpiece transfer site along a path of travel; and means to position said pivot means to a preselected position between and relative to each of said means for delivering and said means for conveying by moving said pivot means toward or away from said means for delivering, said pivot means being moved by said means to position said gripper relative to the workpiece on said means for delivering to compensate for varying length workpieces while the workpieces are manipulated between said first and second orientations and without damaging impact with said means for transferring and without changing the distance between the means for delivery and the means for conveying.

2. The apparatus according to claim 1 wherein said means for delivering a workpiece includes a vacuum chuck to support a workpiece during a printing operation.

3. The apparatus according to claim 1 wherein said means for delivering a workpiece includes a supply conveyor for workpieces to a printing station.

4. The apparatus according to claim 1 wherein said pivot means includes pivot shafts supported to rotate about a pivot axis;

platform means coupled to said pivot shafts for supporting said gripper means; and means to pivot said pivot shaft about a pivot axis for displacing said gripper means between a position for receiving a workpiece by said gripper means and a position for placing a workpiece in said workpiece release position.

5. The apparatus according to claim 4 wherein said means for pivoting said pivot shaft includes reciprocal rods coupled by a cross head for displacement by a cam follower engaged in a cam track, said cam track being defined in a cam plate driven in a synchronous relation with said means for moving the displacable gripper.

6. The apparatus according to claim 5 wherein said reciprocal rods are coupled to said pivot shaft by a linear guide track joined by a roller at one end of a crank arm coupled to said pivot shaft.

7. The apparatus according to claim 1 wherein said means to position includes a frame for rotatably supporting said pivot shaft, means for displacing said frame horizontally towards and away from said means for delivering a workpiece.

8. The apparatus according to claim 7 wherein said means for displacing said frame includes a shaft threadedly engaged with the frame and support structure for said means for conveying the workpiece.

9. The apparatus according to claim 1 further comprising means for maintaining a timed relation between movement of the displaceable gripper of said gripper means and

10. The apparatus according to claim 9 wherein said means for maintaining includes means for adjusting the timed relation between gripping and release positions and cam means for pivoting the displaceable gripper.

11. The apparatus according to claim 1 wherein said gripper means further includes displaceable grippers at each of opposite sides of a workpiece for supporting a workpiece therebetween.

12. The apparatus according to claim 11 wherein the means for moving the displaceable gripper includes a link arm coupled between pivot shafts for each of the displacable grippers at opposite sides of the workpieces for imparting pivotal motion of one gripper to a gripper at the opposite side of the workpiece.

13. The apparatus according to 11 wherein the means for moving the displaceable gripper includes:

rotatable cam rollers each coupled by cam followers to a cross head, means for imparting displacement of the cross head to support rod for a C-shaped gripper for movement of the gripper away from the workpiece; and resilient means for urging the C-shaped gripper into an engagement with a workpiece.

14. The apparatus according to 1 wherein the means for moving the displaceable gripper includes:

a rotatable cam roller coupled by cam a follower to a cross head, means for imparting displacement of the cross head to a support rod for a C-shaped gripper element which is for movement of the gripper away from the workpiece; and resilient means for urging the C-shaped gripper into an engagement with a workpiece.

15. The apparatus according to claim 1 wherein said means for moving the displaceable gripper includes:

means for rotating a drive shaft extending generally parallel to the direction in which said pivot means is moved horizontally;

drive means for positionable along said shaft for driving said means for moving said displacable gripper; and means for establishing a driving relation between said means for driving the movable gripper and said shaft.

* * * * *